(12) United States Patent
Huyssen

(10) Patent No.: US 10,252,373 B2
(45) Date of Patent: Apr. 9, 2019

(54) LASER PROCESSING MACHINE WITH WEIGHT COMPENSATION

(71) Applicant: TRUMPF Laser Marking Systems AG, Gruesch (CH)

(72) Inventor: Dieter Huyssen, Malans (CH)

(73) Assignee: TRUMPF Schweiz AG, Gruesch (CH)

( * ) Notice: Subject to any disclaimer, the term of this patent is extended or adjusted under 35 U.S.C. 154(b) by 564 days.

(21) Appl. No.: 15/004,405

(22) Filed: Jan. 22, 2016

(65) Prior Publication Data
US 2016/0214206 A1    Jul. 28, 2016

(30) Foreign Application Priority Data
Jan. 23, 2015  (EP) ..................................... 15152276

(51) Int. Cl.
| | |
|---|---|
| B23K 26/03 | (2006.01) |
| B23K 26/04 | (2014.01) |
| B23K 26/70 | (2014.01) |
| B23K 26/08 | (2014.01) |
| B23Q 11/00 | (2006.01) |
| B23K 26/352 | (2014.01) |
| B23K 26/364 | (2014.01) |
| G05B 19/404 | (2006.01) |

(52) U.S. Cl.
CPC ............ *B23K 26/048* (2013.01); *B23K 26/03* (2013.01); *B23K 26/083* (2013.01); *B23K 26/0869* (2013.01); *B23K 26/355* (2018.08); *B23K 26/364* (2015.10); *B23K 26/702* (2015.10); *B23K 26/706* (2015.10); *B23Q 11/0025* (2013.01); *G05B 19/404* (2013.01)

(58) Field of Classification Search
CPC ................................ B23K 26/00; B23K 26/08
USPC ........................... 219/121.6, 121.67, 121.78
See application file for complete search history.

(56) References Cited

U.S. PATENT DOCUMENTS

| | | |
|---|---|---|
| 4,149,822 A | 4/1979 | Lehmkuhl |
| 2012/0160816 A1 | 6/2012 | Hubert |

FOREIGN PATENT DOCUMENTS

| | | |
|---|---|---|
| CN | 201205660 | 3/2009 |
| CN | 201253777 | 6/2009 |
| CN | 101730608 | 6/2010 |

(Continued)

OTHER PUBLICATIONS

Chinese Office Action in Application No. 20161 0044573.3, dated Nov. 27, 2017, 11 pages (with English translation).

*Primary Examiner* — Tu B Hoang
*Assistant Examiner* — Thomas J Ward
(74) *Attorney, Agent, or Firm* — Fish & Richardson P.C.

(57) ABSTRACT

Described is a laser processing machine with a height-adjustable laser component, a height-adjustable machine component, and a weight compensation system. The weight compensation system has at least one roller unit that includes at least two rollers fastened on a common axle and rotatably fixed with respect to one another. The axle is configured to rotate freely and slide in a machine frame guide of the laser processing machine. The laser component is held suspended by a first traction member wound onto the first roller. The machine component is held suspended by a second traction member wound onto the second roller. The first traction member and the second traction member are wound in reverse (opposite) directions onto the rollers. A counterweight device acts on the axle by exerting a counterforce, which compensates, at least partially, for the forces exerted by the laser component and the machine component.

16 Claims, 2 Drawing Sheets

(56) References Cited

FOREIGN PATENT DOCUMENTS

| | | |
|---|---|---|
| CN | 102091876 | 6/2011 |
| EP | 2468446 | 6/2012 |
| JP | 57054042 | 3/1982 |
| JP | H07266115 | 10/1995 |

LASER PROCESSING MACHINE WITH WEIGHT COMPENSATION

CROSS REFERENCE TO RELATED APPLICATION

This application claims priority under 35 U.S.C. § 119(a) to European Application No. 15 152 276.0, filed on Jan. 23, 2015, the entire contents of which are hereby incorporated by reference.

TECHNICAL FIELD

The invention relates to laser processing machines with a height-adjustable laser component and with a height-adjustable machine component.

BACKGROUND

Laser processing machines (work stations) for laser marking workpieces can include a work space with a height-adjustable marking laser component ("height-adjustable laser component") and a height-adjustable machine component in the form of a protection door that closes off the work space in a light-tight way. As the lens of the marking laser is directed downward, workpieces to be marked are positioned correspondingly under the marking laser. The focal distance between the workpiece and the marking laser must be relatively precise to facilitate laser marking the workpiece. The marking laser is generally displaced vertically relative to the workpiece to bring the marking laser to the height where the focal distance is correct. The protection door and the marking laser can be automatically driven, but generally only the protection door is equipped with a direct weight compensation system, such as a counterweight, gas spring or spring balancer. Laser marking generally does not implement very high displacement speeds so the axles of the displacement systems can be equipped with relatively small drives.

SUMMARY

Aspects of the invention relate to the task of equipping a height-adjustable laser component of a laser processing machine with a weight compensation system configured to concurrently compensate weight for both a height-adjustable machine component (for example a protection door) and the height-adjustable laser component.

In a first aspect, weight compensation systems in accordance with embodiments of the invention include at least one roller unit, e.g., at least two roller units, first and second traction members, and a counterweight device. Each of the roller units has, for example, at least two rollers fastened on a common axle. The two rollers are rotatably fixed with respect to one another. The common axle of each roller unit is positioned in a machine frame guide of a laser processing machine and is configured to rotate freely and slide in the machine frame guide. The laser component is held suspended on a first roller of each of the respective roller units by a first traction member wound onto the first roller. The machine component is held suspended on a second roller of each of the respective roller units by a second traction member wound onto the second roller. Both of the traction members are wound in reverse (opposite) directions with respect to one another onto the first and second rollers, respectively. A counterweight exerts a counterforce on the common axles, which counterforce compensates, at least partially, the forces exerted by the laser component and the machine component on the common axles in the sliding direction. In some implementations, the counterweight exerts a counterforce on the common axles that completely compensates the forces exerted by the laser component and the machine component.

The height-adjustable laser component can be one, several, or all of the laser beam generating or guiding components of the laser processing machine. For example, the height-adjustable laser component can include the entire laser with a laser resonator and laser processing optical system, or the height-adjustable laser component can include only the laser processing optical system. In embodiments where the height-adjustable laser component includes only the laser processing optical system, the laser processing machine can include a distinct deflection unit and a scanner unit.

Instead of providing weight compensation for laser processing machines with two height-adjustable masses (laser component and machine component) that are independent from each other, one for the laser component and one for the machine component, in the present invention the laser component and the machine component are incorporated into one single (common) weight compensation system, namely without installing additional force actuators (counterweights, gas springs, spring balancers, etc.).

According to some embodiments of the invention, two rollers with different radii, fitted concentrically to each other and rotating freely around their axle, onto which a traction member of the laser component and a traction member of the machine component are wound, reach a force distribution that equals the radius ratio of the two joined rollers. Weight compensation is achieved through the axle of the one or more roller units, e.g., two roller units. If a mass is, for example, displaced by a motor in an upward direction, the other mass is not displaced due to self-retention of its non-driven motor on the one hand, and the traction member of the motor-driven mass is wound off its roller on the other hand, while the other traction member is wound onto its roller faster or slower, depending on its radius. The roller units therefore move in the opposite direction of the motor-displaced mass in the machine frame guide, but not at the same speed as the displaced mass. The different roller radii that allow differences from the masses to be compensated also permit a transmission system in accordance with embodiments of the invention to be produced in a manner that can be precisely adjusted to different masses via appropriate adjustment to the corresponding ratio of the radii of the rollers with respect to one another.

In another aspect, the invention includes methods of weight-compensating a height-adjustable laser component and a height-adjustable machine component in a laser processing machine. The methods include providing a weight compensation system that includes at least one roller unit, first and second traction members, and a counterweight device. Each roller unit includes a first roller and a second roller fastened on a common axle and rotatably fixed with respect to one another, wherein the common axle is positioned and configured to rotate and slide freely in a machine frame guide of the laser processing machine. The methods include suspending the height-adjustable laser component by the first traction member wound onto the first roller, suspending the height-adjustable machine component by the second traction member wound onto the second roller, wherein in each roller unit the first traction member and the second traction member are wound in reverse directions onto the first roller and the second roller with respect to one another, and adjusting or configuring the counterweight device to act on the common axle of each roller unit by exerting a counterforce on the common axle, wherein the counterforce compensates, at least partially, forces exerted respectively by the height-adjustable laser component and the height-adjustable machine component on the common axle in a sliding direction in the machine frame guide.

The common weight compensation systems described herein enable the use of overall smaller force actuators for the weight compensation than is the case with direct compensation actuators for each of the masses moved individually, with each counterforce equaling their relevant own weight. This is possible in the new systems and methods because the weight of the machine component is used to compensate the weight of the height-adjustable laser component.

In certain embodiments, the vertical movements of, e.g., a marking laser can be facilitated by a ball screw driven by stepper motors. The large mass of the marking laser can be implemented via a large stepper motor or by small pitch increases to generate the necessary force for lifting the mass. This "large" force correspondingly also poses a risk of injury in case of a fault and requires safety precautions or monitoring. When using the weight compensation system according to embodiments of the invention, the drive chains used for the height-adjustable laser component can be configured to be significantly smaller than the drive chain used for systems with uncompensated masses or systems with an independent weight compensation system and can therefore be inherently safe.

As the use of the weight compensation system according to embodiments of the invention means that the driving force required is much smaller than with uncompensated masses, larger displacement speeds can also be achieved with smaller drives. This advantage is particularly noticeable with laser processing machines that require frequent reference movements. During a reference movement, the marking lasers typically move into the upper maximum position and then back to the zero position, i.e., almost twice the entire displacement range. The higher speed also saves production time, in particular, when frequent height changes of the marking laser are necessary.

With laser processing machines without compensation masses it is not practical to move the marking laser manually, either when the motor is off or in the normal condition when the motor is powered, as the holding forces must be very large. On the other hand, weight compensation systems according to embodiments disclosed herein permit working with smaller holding forces, which can also be overcome manually in an emergency.

Stepper motors are typically equipped with shaft brakes to prevent an unintentional dropping of the marking laser. Such shaft brakes are activated when the motor is off, as the weight force of the marking laser is too great for the self-retention of the spindle and the motor to prevent dropping the marking laser in this state. However, the weight compensation systems of the height-adjustable laser component as described herein can render such shaft brakes unnecessary. As mentioned above, the drive actuators, in particular, can be designed to be smaller, because only inertial forces now need to be overcome and hardly any weight forces.

As the weight compensation systems described herein invention require very little net energy, less energy is used for the height movements. In addition the holding current of the height drive can be smaller than in the uncompensated case, especially as the holding current is typically applied continuously when the laser processing machine is switched on.

It is noted that the weight compensation systems described herein may not be suitable for use in dynamic systems, in which dynamic forces are transmitted from one system to the other and the systems can thus influence each other. In most applications for laser processing machines neither dynamics worth mentioning nor simultaneous movements are required, so that an elimination of dynamic effects by means of holding current, shaft brakes, or spindle friction of motors is easy to realize.

The radii of the rollers and the counterforce of the counterforce device are preferably selected in such a way that no torque is applied to the axle in the idle state, and no force acts in a displacement direction, so that torque applied to the axle by the laser component and the machine component as well as forces applied to the axle in displacement direction by the laser component, machine component and counterforce device, are compensated.

The first traction member and/or the second traction member is/are preferably diverted via deflection pulleys in such a way that the weight force of the laser component and the weight force of the machine component act on the axle in opposite directions or in the same direction. In the first case, the weight force of the laser component and the weight force of the machine component applied to the axle are already partially compensated there, so that the counterweight needs to compensate only the difference between the weight forces of the laser component and the machine component. In the second case, the weight forces of the laser component and the machine component are added to each other, so that the counterweight needs to compensate for the sum of the weight forces of laser component and machine component. The direction of the weight forces of the laser component and machine component can be selected freely by means of diversion via the deflection pulleys depending on the requirements of the machine or the installation situation.

The counterforce device can be formed by a counterweight that is held suspended on the axle—for example, via one or more deflection pulleys—or by a gas spring or a spring balancer that engages the axle and applies the most constant counterforce possible. In embodiments where a gas spring or a spring balancer is used (for example a tension spring or spring rope pulley), the effective direction of the counterforce can be freely selected, so that an installation of the weight compensation system in a horizontal position above the work space is, for example, also possible.

The machine frame guide can extend vertically, obliquely or horizontally, wherein a counterweight can engage the roller axle via a deflection pulley in the latter case.

The invention is particularly suitable for laser marking machines with a marking laser, but also for all other laser processing machines with a height-adjustable laser component. Laser processing machines are therefore well suited for implementations of weight compensation system embodiments, as no significant process forces posing a significant risk to the balance of the system act upon the weight-compensated masses (as is for example the case with machining tools).

Further advantages and advantageous designs of the invention result from the description, the claims and the drawing. The above mentioned characteristics and those yet to be mentioned can also each be used individually or in combinations. The embodiments shown and described should not be understood as exclusive listings, but rather as examples to illustrate the invention. The figures show certain embodiments of the invention in a schematic way and are not to scale.

The details of one or more embodiments of the invention are set forth in the accompanying drawings and the description below. Other features, objects, and advantages of the invention will be apparent from the description and drawings, and from the claims.

DETAILED DESCRIPTION

Identical reference numbers have been used for the same or functionally identical components in the following description of the drawings.

Figure 1:
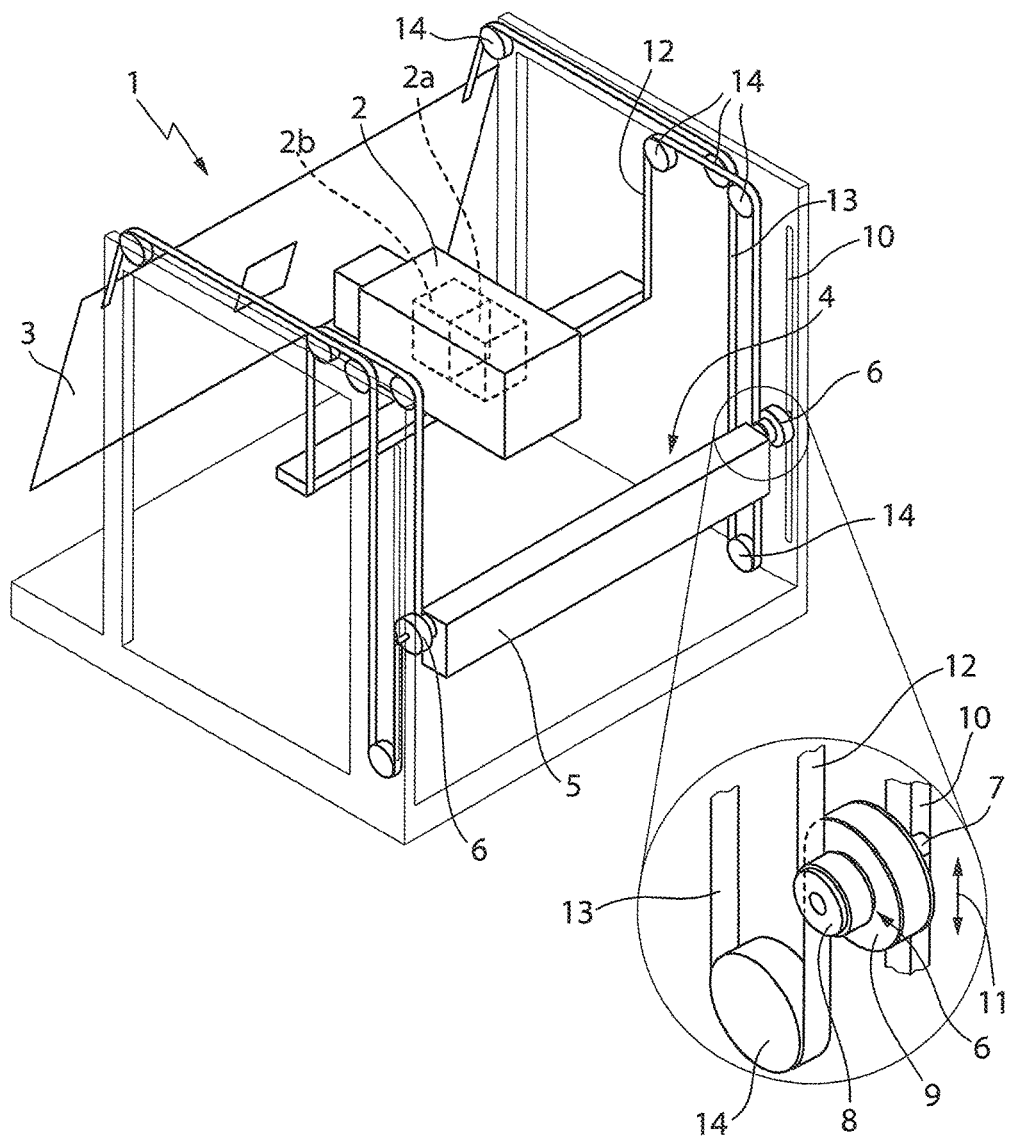
FIG. 1 is a perspective view of a laser processing machine according to the invention.

FIG. 1 shows a laser processing machine 1. The laser processing machine 1 shown in FIG. 1 is a marking laser work station with a height-adjustable marking laser 2, a height-adjustable protection door 3, and a common weight compensation system 4 for the marking laser 2 and the protection door 3. The weight mL of the marking laser 2 is typically approximately twice that of the weight mT of the protection door 3. For reasons of clarity, drive elements (motors, spindles) and guides of the marking laser 2 and the protection door 3 are not shown.

The weight compensation system 4 comprises a counterweight device 5 in the form of a counterweight mG and two roller units 6, which are rotatably mounted on the counterweight mG, one on each side. Each roller unit 6 comprises two rollers 8, 9 fastened on a common axle 7 in a non-rotatable manner (i.e., configured to rotate together and not to rotate with respect to one another), with different radii R1, R2, wherein the axle 7 is held freely rotatable and can slide in a vertical machine frame guide 10 (sliding direction 11). As shown schematically in FIG. 2, for one roller unit 6, the marking laser 2 is suspended from the smaller rollers 8 by a first traction member 12 wound onto the rollers 8, and the protection door 3 is suspended from the larger rollers 9 by a second traction member 13 wound onto the rollers 9. The two traction members 12, 13 are wound in reverse directions onto the rollers 8, 9 and can be embodied as cables, belts or chains, but are not limited thereto. The two traction members 12, 13 are diverted via deflection pulleys 14 in such a way that the weight force FL of the marking laser 2 acts upon the axle 7 in an upward direction, and the weight force FT of the protection door 3 acts in a downward direction. Counterweight mG suspended from the axle 7 applies a downwardly directed counterforce FG onto the axle 7, which can completely compensate the weight forces applied to the axle 7 in sliding direction 11 by the marking laser 2 and the protection door 3 in an idle state, i.e., FG=FL−FT. The radii R1, R2 of the rollers 8, 9 are selected in such a way that no torque is applied to the axle 7 in the idle state, i.e., R1×FL=R2×FT. In the embodiments illustrated, the marking laser 2 is twice as heavy as the protection door 3, so that the traction member 12 of the marking laser 2 is wound onto the smaller roller 8 and the ratio of the roller radii is R1:R2 approx. 1:2.

The functionality of the weight compensation system 4 is described as follows:

Neither a torque nor a force is applied upon the axle 7 in sliding direction 11 in an idle state, so that the two roller units 6 neither rotate nor move in the sliding direction and the marking laser 2 and the protection door 3 are weight compensated.

If the marking laser 2 is displaced in height, for example lowered by its drive motor, the protection door 3 remains fixed at its height by the self-retention of its non-driven motor. By lowering the marking laser 2, the first traction member 12 is wound onto its roller 8 and the second traction member 13 is wound off its roller 9 (i.e., they are wound in reversed directions with respect to one another), wherein the first traction member 12 is wound up faster due to the smaller radius R1 of its roller 8 than the second traction member 13 is wound off its roller 9. The two roller units 6 are thus moved upwards in the machine frame guide 10, i.e., in reverse direction to the lowered marking laser 2 and at twice the speed of that of the lowered marking laser 2.

If the marking laser 2 is lifted by means of its drive motor, the protection door 3 remains fixed at its height by the self-inhibition of its non-driven motor. By lifting the marking laser 2, the first traction member 12 is wound off its roller 8 and the second traction member 13 is wound onto its roller 9, wherein the first traction member 12 is wound off faster due to the smaller radius R1 of its roller 8 than the second traction member 13 is wound onto its roller 9. The two roller units 6 are thus moved downwards in the machine frame guide 10, i.e., in a reverse direction to the lifted marking laser 2 and at twice the speed of that of the lifted marking laser 2.

As only an upward or downward displacement force is applied to the axle 7 when lowering or lifting the marking laser 2, the moving marking laser 2 remains weight compensated by means of the protection door 3 and the counterweight mG.

If the protection door 3 is displaced in height, for example lowered by its drive motor, the marking laser 2 remains fixed at its height by the self-retention of its non-driven motor. By lowering the protection door 3, the second traction member 13 is wound off its roller 9 and the first traction member 12 onto its roller 8, wherein the second traction member 13 is wound off more slowly due to the greater radius R2 of its roller 9 than the first traction member 12 is wound onto its roller 8. The two roller units 6 therefore move upward in the machine frame guide 10, i.e., in reverse direction to the lowered protection door 3 and at twice the speed of the lowered protection door 3.

If the protection door 3 is lifted by means of its drive motor, the marking laser 2 remains fixed at its height by the self-retention of its non-driven motor. By lifting the protection door 3, the second traction member 13 is wound onto its roller 9 and the first traction member 12 off its roller 8, wherein the second traction member 13 is wound on more slowly the due to the greater radius R2 of its roller 9 than the first traction member 12 is wound off its roller 8. The two roller units 6 therefore move downward in the machine frame guide 10, i.e., in reverse direction to the lifted protection door 3 and more slowly than the lifted protection door 3, wherein the potential energy of the system consisting of the protection door 3 and the counterweight device 5 always remains the same.

As only an upward or downward displacement force is applied to the axle 7 when lowering or lifting the protection door 3, the moving protection door 3 remains weight compensated by means of the marking laser 2 and the counterweight mG.

Figure 2:
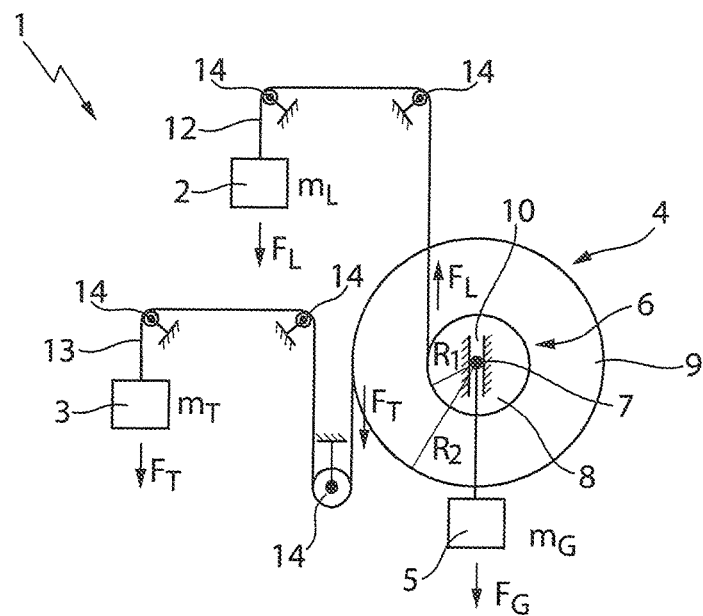
FIG. 2 is a schematic illustration of the forces applied by the laser processing machine shown in FIG. 1.
Figure 3:
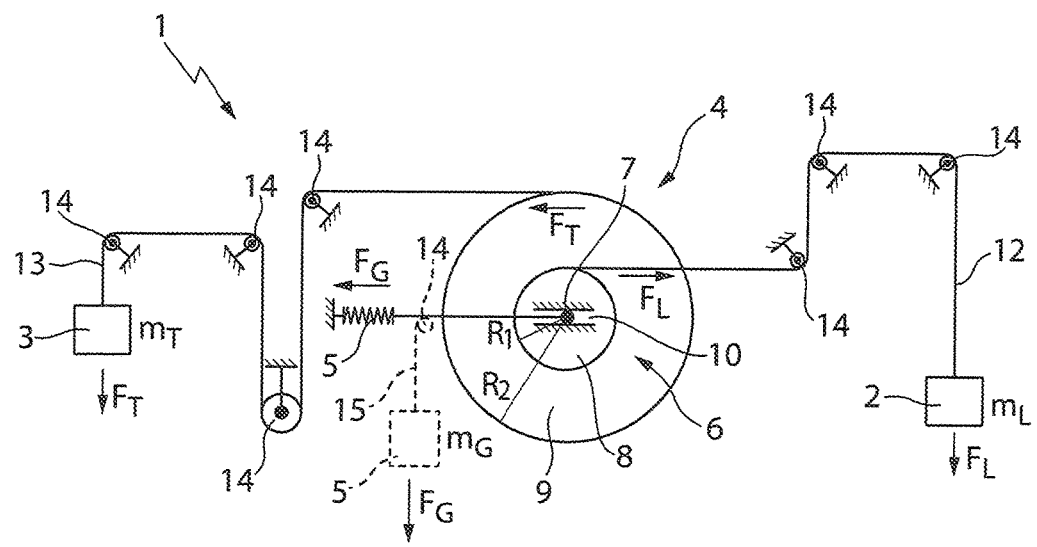
FIG. 3 is a schematic illustration of the forces applied by a laser processing machine modified from that shown in FIG. 1.

Unlike in the system shown in FIG. 2, only the machine frame guide 10 is aligned horizontally in the laser processing machine 1 of FIG. 3 and the counterweight device 5 is formed by a spring balancer, which engages the axle 7 with counterforce FG. The spring balancer can, for example, be designed as a tension spring or a gas spring, as indicated in FIG. 3, or as a spring rope pulley pre-tensioned against unwinding. As shown by means of the broken line, the counterweight device 5 can also be a counterweight mG, suspended from the axle 7 by means of a traction member 15 and diverted via a deflection pulley 14.

The machine frame guide 10 can also be aligned obliquely instead of vertically, as shown in FIGS. 1 and 2, or horizontally as shown in FIG. 3.

Unlike the embodiments of FIGS. 1 to 3, where the entire marking laser 2 can be height adjusted with the laser resonator 2a and the laser processing optical system 2b, in some embodiments, only the laser processing optical system 2b can be height adjustable, for example, while the laser resonator 2a is positioned stationary inside or outside of the laser processing machine. In some embodiments, only the laser processing optical system with the diversion unit are height adjustable. In such embodiments, a fiber laser, and the laser light from the stationary laser resonator can be guided to the laser processing optical system by means of a laser light cable.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A laser processing machine comprising:
   a machine frame guide;
   a height-adjustable laser component;
   a height-adjustable machine component; and
   a weight compensation system comprising at least one roller unit, first and second traction members, and a counterweight device;
   wherein each roller unit comprises a first roller and a second roller fastened on a common axle and rotatably fixed with respect to one another, wherein the common axle is positioned and configured to rotate and slide freely in the machine frame guide,
   wherein the height-adjustable laser component is held suspended by the first traction member wound onto the first roller,
   wherein the height-adjustable machine component is held suspended by the second traction member wound onto the second roller,
   wherein in each roller unit the first traction member and the second traction member are wound in reverse directions onto the first roller and the second roller with respect to one another, and
   wherein the counterweight device is configured to act on the common axle of each roller unit by exerting a counterforce on the common axle, wherein the counterforce compensates, at least partially, forces exerted respectively by the height-adjustable laser component and the height-adjustable machine component on the common axle in a sliding direction in the machine frame guide.

2. The laser processing machine of claim 1, wherein the counterweight device is configured to act on the common axle of each roller unit by exerting a counterforce on the common axle that completely compensates the forces exerted respectively by the height-adjustable laser component and the height-adjustable machine component on the common axle in the sliding direction in the machine frame guide.

3. The laser processing machine of claim 1, wherein radii R1 and R2 of the first roller and the second roller, respectively, and the counterweight device are selected such that in the idle state no torque is applied to the common axle and no force is applied in the sliding direction to the common axle.

4. The laser processing machine of claim 1, further comprising a deflection pulley configured to deflect at least one of the first traction member and the second traction member, wherein the force of the laser component and the force of the machine component act on the common axle in opposite directions.

5. The laser processing machine of claim 1, further comprising a deflection pulley configured to deflect at least one of the first traction member and the second traction member, wherein the force of the laser component and the force of the machine component act on the common axle in the same direction.

6. The laser processing machine of claim 1, wherein the counterweight device is formed by a counterweight mG suspended on the common axle.

7. The laser processing machine of claim 1, wherein the weight compensation system comprises a pair of roller units, wherein one roller unit is rotatably mounted on each side of the counterweight mG, wherein the common axles of each of the roller units are configured to rotate freely and slide in the machine frame guide, and wherein the pair of roller units is associated with a pair of first traction members wound onto the respective first rollers and a pair of second traction members wound onto the respective second rollers.

8. The laser processing machine of claim 1, wherein the counterweight device comprises at least one of a pneumatic spring and a spring balancer engaging the common axle.

9. The laser processing machine of claim 1, wherein the machine frame guide is aligned vertically.

10. The laser processing machine of claim 1, wherein the machine frame guide is aligned horizontally.

11. The laser processing machine of claim 1, wherein the machine frame guide is aligned obliquely.

12. The laser processing machine of claim 1, wherein each of the first traction members and the second traction members comprise at least one of a cable, a belt, and a chain.

13. The laser processing machine of claim 1, wherein the height-adjustable laser component comprises a laser processing optical system.

14. The laser processing machine of claim 13, wherein the height-adjustable laser component comprises a laser resonator.

15. The laser processing machine of claim 13, wherein the laser processing optical system comprises a deflecting unit and a scanner unit.

16. The laser processing machine of claim 15, wherein the height-adjustable laser component comprises a laser resonator.

* * * * *